United States Patent Office 2,709,699
Patented May 31, 1955

2,709,699

EXTRACTING HEMICELLULOSES

Michael J. Wolf, John A. Cannon, and Majel M. Mac-Masters, Peoria, Ill., assignors to the United States of America as represented by the Secretary of Agriculture No Drawing. Application July 18, 1952,
Serial No. 299,773

4 Claims. (Cl. 260—209)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the extraction of hemicelluloses from hemicellulose-containing plant substances by means of alkaline treatment. More particularly, the invention relates to the extraction of hemicelluloses from such substances as corn hulls, and other essentially unlignified plant materials containing appreciable amounts of hemicelluloses by a process which includes a treatment of the material with hot dilute aqueous alkali.

Hemicelluloses are useful in industry as thickening agents, protective colloids and as ingredients in coating compositions. They are also useful as a source of pentose sugars and as an intermediate material in the manufacture of furfural.

Hemicelluloses occur in plant substances in varying proportions. They are non-fibrous carbohydrates, and occur in close association with the cell wall substance of plants. Although soluble in water after isolation from the plant, hemicelluloses are not extractable directly from such plant substances by water. Alkali treatment is necessary to effect solubilization. The manner of the association of hemicelluloses to the plant structure is not known definitely, but it is known, however, that they are bound in some way and the bonding mechanism must be broken before the hemicellulose material can be recovered.

We have discovered a method for extracting hemicelluloses from plant substances containing them which affords a minimum degradation of the hemicellulose material and the associated plant substance while at the same time the recovery is in good yield.

We have discovered that corn hulls, or other similar hemicellulose-containing substances low in lignin, may be treated with certain alkalis within the range of pH 9 to pH 13 to solubilize the hemicellulose content and render it available to extraction by water. The preferred range of treatment is pH 10–12. The solubilization is accomplished by treating at temperatures within the range of 90° to about 115° C. The lower extreme is not critical, since the solubilization reaction takes place at room temperature, but it is so slow as to be rather impractical. Our upper temperature limit, i. e. 115° C., corresponds to about 20 pounds gage steam pressure. Higher temperatures may be used if desired, however.

The conditions of time, temperature and pH, it will be understood, are somewhat correlated. The time of treatment, for example, at the lower temperature and the lower pH is somewhat greater than the time required at the higher pH and higher temperatures. Inasmuch as it is generally desirable to avoid drastic conditions and thus minimize degradation, we prefer to maintain the conditions of temperature and alkalinity as mild as practicable without entailing prolonged times. For example, one set of working conditions which we have found satisfactory is to heat an aqueous suspension or slurry of the hemicellulose-containing material at a pH of 10.5–11 for about 30 minutes to 1 hour at incipient boiling.

Two phenomena occur during our process. The first is the solubilization of the hemicelluloses, and the second is the extraction of the solubilized hemicelluloses from the fibrous material which contains them. Though some extraction occurs with the alkaline treatment, we have found that laboratory batch operation requires repeated extractions. For example, the alkaline treatment produces a liquid containing some solubilized hemicelluloses. After separation of this liquid, the residual solids are then subjected to further extraction. This may be followed by a third, fourth, etc., the number of extractions being determined by the degree of completeness of extraction desired. The hemicelluloses may be recovered from the separated liquors or extracts by spray drying or by precipitation as explained in detail below.

Our process is, however, not limited to batch methods and may be carried out by continuous countercurrent methods, as will be evident to those skilled in the art. One feature which lends to our extraction method obvious economic advantage is the fact that once the hemicelluloses have been solubilized by the initial alkaline treatment they may be extracted by water. Thus it is unnecessary to add alkali during subsequent batch extractions.

Our process possesses the advantage of reduction in alkali consumption, and corresponding decrease in the cost of operation and maintenance. Moreover, the hemicellulose product produced by our process contains considerably reduced ash and the products are degraded to a minimum extent. These advantages, together with the general simplification of the procedure, such as the elimination of periodic adjustments of pH, alkali additions and the like, render our process suitable as a practical method for recovering valuable by-products from grain milling industries.

According to our discoveries, the alkali required for satisfactory solubilization is a base, such as an alkali metal base, sodium carbonate, sodium hydroxide, soda ash, potassium carbonate, and the like. For convenience in operation, the alkali should be non-volatile, although volatile bases may be used, provided precautions are taken to prevent escape of the alkali from the reaction mixture. The starting material is preferably comminuted to a finely divided state to facilitate the alkali solubilization and extraction. In the case of such materials as corn hulls it is preferable that the starch content be a minimum or entirely absent.

The hemicelluloses, prepared according to this invention have potential utility as thickening agents in foods and food preparations, as protective colloids, in sizing and coating compositions for use in the paper and textile arts.

It is necessary that the designated pH ranges be maintained throughout the solubilization stage. We have discovered that the pH of the solubilization mixture tends to drop during the treatment, probably due to reaction with acidic constituents and to adsorption and absorption of alkali by the fibrous cellular substances present. This frequently means that not only the original alkali must remain in the reaction medium, but also that additional alkali must be added. The alkali used in the solubilization step exerts a residual effect in the subsequent extractions, so that the pH stays alkaline, and frequently stays within the designated range during the subsequent extractions with water.

The following examples illustrate the invention. In Example 1 the solubilization step is followed by a series of alkaline extractions. Examples 2, 3, and 4 are comparative processes in which the solubilized hemicelluloses were extracted with water. These examples illustrate the reduction in ash content in the product, and they also show that the overall yield of hemicellulose is as good or better when water is used to extract the solubilized hemicelluloses.

Example 1

Starch-free corn hulls, obtained as in the wet milling of corn, were ground to a powdery state, and a batch of 66.2 gr., dry basis (64.8 ash free), was slurried in 400 ml. of 2 percent sodium carbonate. The pH of the slurry was 10.11. It was heated at the boil for one hour and then centrifuged. The supernatant liquor was acidified with hydrochloric acid to pH 4.0 and three volumes of absolute ethanol added to precipitate the hemicelluloses. The precipitate was separated by filtration and dried in a vacuum desiccator.

The residue from the centrifugation step was slurried with 300 ml. of 2 percent sodium carbonate (pH 10.3) and the slurry heated for one hour at the boil and then centrifuged. The supernatant after adjustment to pH 4.0 was treated as above, and the residue reslurried with 350 ml. of 2 percent carbonate (pH 10.5), and the extraction and centrifugation steps repeated as above. The supernatant was treated as in the preceding step, and the residue slurried with 350 ml. of 2 percent sodium carbonate (pH 10.6), and the extraction and centrifugation repeated as above. After precipitation and recovery of the product from the supernatant, the slurry was again extracted with 300 ml. of 2 percent sodium carbonate (pH 10.8), centrifuged, and the supernatant treated as above. The yield of hemicelluloses from the supernatants of the steps of the foregoing process, based on the dry weight of the original ground hulls, was 3.0 percent, 8.4 percent, 11.9 percent, 7.2 percent and 3.7 percent respectively, or a total yield of 34.2 percent. The ash content of the product was 4.85 percent.

Example 2

The procedure of Example 1 was repeated, except that six consecutive batch extractions were made, counting the initial slurry as the first extraction. Moreover, water was used for the last four extractions instead of the sodium carbonate used in the preceding example. The pH of these last four slurries were each approximately 10.5. The total yield, dry basis, of hemicelluloses, based on the original dry weight of the hulls, was 33.9 percent. The ash content was 1.18 percent. The last extraction yielded only 0.2 percent.

Example 3

The first step of Example 1 was repeated, using sodium hydroxide as the alkali. The alkaline treatment (pH 11.6) was followed by a series of three water extractions. The pH's of the water extractions were 11.6, 10.6 and 10.0, respectively. A total yield, on the same basis of the preceding examples of 37.8 percent was obtained. The ash content of the hemicelluloses was 2.28 percent.

Example 4

Example 3 was repeated. The water extractions, however, were carried out at room temperature, i. e. approximately 20° C. The total yield of hemicelluloses after five water extractions was 39.2 percent. The ash content of the product was 1.91 percent.

We claim:

1. The method comprising heating corn hulls in aqueous alkaline medium to a temperature within the range of 90° C. to 115° C. at a pH within the range of 9 to 13 for a time sufficient to solubilize the hemicelluloses present and subsequently removing the hemicelluloses from said substance by extraction.

2. The method comprising heating corn hulls in aqueous alkaline medium to a temperature within the range of 90° to 115° C. at a pH of 10 to 12, maintaining said pH and said temperature for an appreciable period of time, said period being sufficient to solubilize the hemicelluloses and subsequently separating the hemicelluloses from the hulls by extraction.

3. The method of claim 1 in which the solubilized hemicelluloses are extracted with water.

4. The method comprising solubilizing corn hulls by aqueous alkaline treatment at 90° to 115° C. at a pH of 9 to 13 and subsequently extracting solubilized hemicelluloses from said plant substanace by means of water, separating the plant substance from the extract, recovering hemicelluloses from the separated extract and re-extracting the residual plant substance with more water to extract additional hemicelluloses therefrom.

References Cited in the file of this patent

UNITED STATES PATENTS

| | | |
|---|---|---|
| 2,073,616 | Acree | Mar. 16, 1937 |
| 2,218,567 | White | Oct. 22, 1940 |